Aug. 5, 1952  H. C. RHODES  2,605,722
APPARATUS FOR DISTRIBUTING MOISTURE IN BREAD
Original Filed April 7, 1945
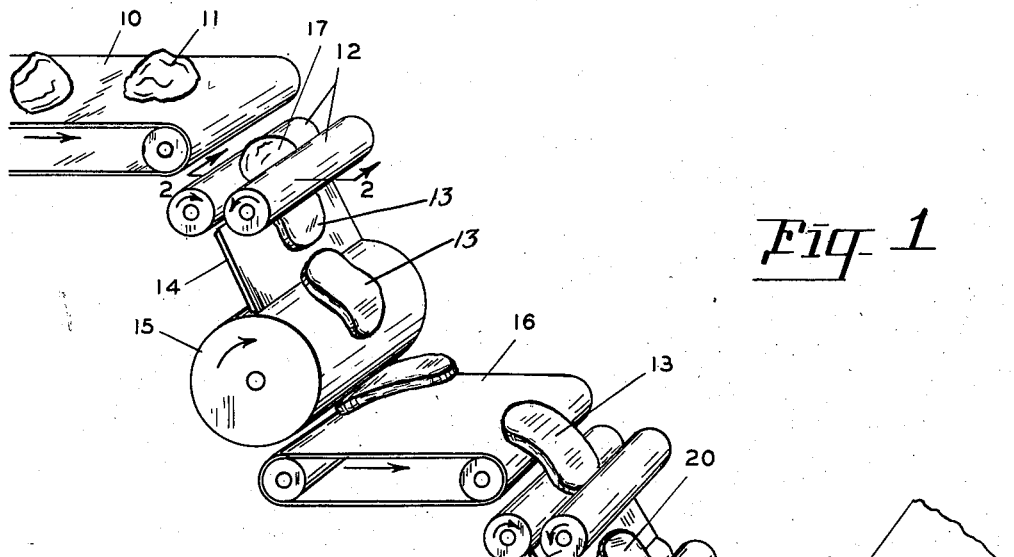
*Fig. 1*
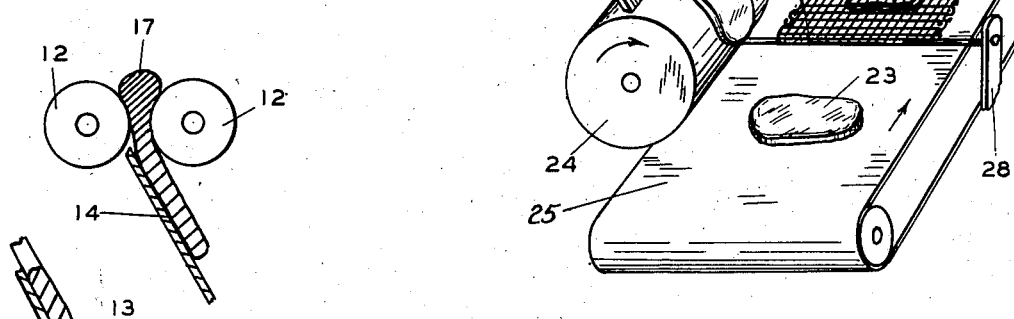
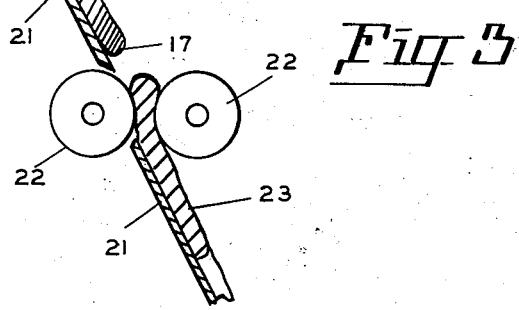
*Fig. 2*
*Fig. 3*
INVENTOR.
Herbert C. Rhodes
BY Otto Moeller
ATTORNEY Patented Aug. 5, 1952

2,605,722

UNITED STATES PATENT OFFICE 2,605,722

APPARATUS FOR DISTRIBUTING MOISTURE IN BREAD

Herbert C. Rhodes, Portland, Oreg., assignor to Read Standard Corporation, a corporation of Delaware Original application April 7, 1945, Serial No. 587,100, now Patent No. 2,479,864, dated August 23, 1949. Divided and this application February 28, 1949, Serial No. 78,706

5 Claims. (Cl. 107—9)

1

This invention relates generally to the baker's art and particularly to an apparatus for distributing moisture in bread and is a division of the parent case, Serial No. 587,100, filed April 7, 1945, now Patent No. 2,479,864, dated August 23, 1949.

The main object of this invention is to devise an apparatus for preparing dough for baking bread in which the moisture content will be uniformly distributed throughout the entire mass.

The second object is to provide an apparatus for preparing bread dough so that the completed loaf will not have the well-known and objectionable "dry end."

The third object is to provide an apparatus for processing the dough so that it is immaterial whether it is rolled lateraly or longitudinally in its final step before being placed in the pan.

I accomplish these and other objects in a manner set forth in the following specifications as illustrated in the accompanying drawing, in which:

Fig. 1 is a somewhat diagrammatic perspective view of the apparatus showing the various steps through which the dough passes.

Fig. 2 is a section taken along the line 2—2 in Fig. 1, showing the first step in which the moisture is concentrated in one portion of the dough strip.

Fig. 3 is a section showing the strip of dough formed by the apparatus in Fig. 2 in a reverse position and passing through a second set of rollers for the final distribution of the moisture.

Like numbers of reference refer to the same or similar parts throughout the several views.

Referring in detail to the drawing, there is shown a conveyor 10 from which chunks of dough 11 are received from a loaf preparing machine, whose unrelated details are not shown. Below the discharge end of the conveyor 10 are shown a pair of rollers 12, between which the dough 11 passes to form an elongated strip 13, which rides down along the inclined plate 14 to the cylinder 15, where it is inverted upon the conveyor 16.

It will be noted in Fig. 2 that the end 17, which is the last to pass through the rollers 12, contains the most moisture. It will be noted in Fig. 3 that the strip 13 approaches the second set of rollers 18 with the moist end 17 foremost. The strip 20, which emerges from the rollers 18, passes over the plate 21 and through a third set of rollers 22 to complete the moisture distributing action. The strip 23 which emerges from the rollers 22 will be found to have a uniform moisture content throughout its length and breadth. This may be rolled either longitudinally or transversely.

In the present case, I prefer to pass the strip 23 over the drum 24 which deposits it on the conveyor 25, moving transversely with relation to the plane of the previously described movement of the strip.

Attention is drawn to my co-pending application, Serial Number 577,223, filed February 10, 1945, now Patent Number 2,534,734 of December 19, 1950, over which the apparatus herein described is an improvement.

From the foregoing it can be seen that the strip 20 or 23 can be deposited directly upon the conveyor 25 either in the direction illlustrated or in the line of travel during the first steps in the process without departing from the spirit of this invention, or detracting from the quality of the finished product. That is to say, once the moisture content of the strip has been rendered uniform throughout its length and breadth, it is immaterial whether it is curled lengthwise or transversely.

It is desirable to provide a wire chain cloth 26, which is supported by the rod 27 on the standards 28 at one end and permitted to ride upon the conveyor 25 at the other end, the purpose of which is to roll the strip of dough 23 and make same ready for the pan.

While I have thus illustrated and described my invention, it is not my desire to be limited to the precise form shown herein, and I intend to cover such forms and modifications of the invention as fall fairly within the appended claims.

I claim:

1. A dough moulder comprising a plurality of sets of sheeting rollers defining a continuous path, one set of said rollers engageable with and compressing a mass of dough to form an elongated sheet, an inverting means positioned beneath the first mentioned set of rollers and arranged to receive said elongated sheet, a transfer means co-acting with said inverting means to receive said elongated sheet therefrom in an inverted position, a second set of rollers positioned beneath said transfer means for further compressing said elongated sheet, said first and second sets of rollers being disposed in aligned relation with one another in an inclined plane in said continuous path and said second set of rollers arranged to receive from said transfer means the elongated sheet with the end of said sheet that last engaged said inverting means being the end first engaged by said second set of rollers.

2. A dough moulder comprising a plurality of sets of sheeting rollers defining a continuous path, one set of said rollers engageable with and compressing a mass of dough to form an elongated sheet, a rotary drum positioned beneath the first mentioned set of rollers and arranged to receive said elongated sheet, a rotating member coacting with said rotary drum to receive said elongated sheet therefrom in an inverted position, a second set of rollers positioned beneath said rotating member for further compressing said elongated sheet, said first and second sets of rollers being disposed in aligned relation with one another in an inclined plane in said continuous path and said second set of rollers arranged to receive from said rotating member the elongated sheet with the end of said sheet that last engaged said rotary drum being the end first engaged by said second set of rollers.

3. A dough moulder comprising a plurality of cooperating rollers for sheeting successive dough pieces, said rollers presenting a downwardly sloping passageway for sheeted dough pieces, a rotatable drum and a cooperating endless traveling surface interposed between an adjacent pair of cooperating rollers to provide a first set of rollers and a second set of rollers, said rotatable drum being disposed with a portion of its peripheral surface extending across said passageway for receiving the sheets of dough emerging from said first set of rollers and said rotatable drum upon continued rotation flipping said sheets of dough from its peripheral surface trailing edge foremost, and said endless traveling surface being disposed to receive the dough sheets from said drum trailing edge foremost, said second set of rollers being disposed to receive said dough sheets from said endless traveling surface for re-rolling said dough sheets in a direction opposed to the direction of rolling by said first set of rollers, said first set of rollers, said rotatable drum, said endless traveling surface and said second set of rollers being disposed in aligned relation in an inclined plane with their axes of rotation disposed in parallel relation.

4. In a machine for moulding dough pieces and the like embodying a conveyor adapted to receive in a single path a plurality of spaced dough masses, cooperating rollers positioned beneath the conveyor at the discharge end thereof, said rollers adapted to engage the dough masses to form elongated sheets, a rotatable drum disposed subjacent said rollers to receive the elongated sheets of dough on the downwardly moving peripheral portion of its surface, a rotatable receiving member rotating in the same direction as said drum and disposed with its upper surface offset from and below the upper surface of said drum, said drum upon continued rotation flipping said sheets of dough from its peripheral surface trailing edge foremost while delivering the sheets to the upper surface of said receiving member, a second set of cooperating rollers disposed to receive the sheets of dough from said receiving member for rerolling said dough sheets in a direction opposed to the direction of rolling by said first set of cooperating rollers, said first set of rollers, said rotatable drum, said rotatable receiving member and said second set of rollers being disposed one forward of the other in that order and being alined in an inclined plane whereby the elongated sheets travel throughout in the direction of their elongation.

5. In a machine for moulding dough pieces and the like embodying a conveyor adapted to receive in a single path a plurality of spaced dough masses, cooperating rollers positioned beneath the conveyor at the discharge end thereof, said rollers adapted to engage the dough masses to form elongated sheets, a rotatable drum disposed below and spaced from said rollers, a second conveyor disposed forward of and below said drum, said drum adapted to receive the dough sheets for overturning or inverting said sheets while delivering the sheets to said second conveyor, a second set of rollers disposed below and at the discharge end of the last mentioned conveyor, said second set of rollers engaging the dough sheet as the sheet is discharged from the last mentioned conveyor, a rotatable drum disposed below said second set of rollers, a conveyor arranged beneath the last mentioned drum, said last mentioned drum engaging the dough sheet for inverting the sheet upon said last mentioned conveyor, said first and second sets of rollers, said second conveyor and said first and second rotatable drums being alined in an inclined plane and having their axes of rotation disposed in parallelism.

HERBERT C. RHODES.

REFERENCES CITED

The following references are of record in the file of this patent:

UNITED STATES PATENTS

| Number | Name | Date |
| --- | --- | --- |
| 787,273 | Burns | Apr. 11, 1905 |
| 806,869 | Burns | Dec. 12, 1905 |
| 1,831,531 | Harber | Nov. 10, 1931 |
| 2,101,621 | Maas | Dec. 7, 1937 |
| 2,275,714 | Anetsberger et al. | Mar. 10, 1942 |
| 2,373,012 | Burdett et al. | Apr. 3, 1945 |